United States Patent
Lence Barreiro et al.

(10) Patent No.: US 6,330,936 B1
(45) Date of Patent: Dec. 18, 2001

(54) ELEVATOR BEHAVIOR REPORTED IN OCCURRENCE-RELATED GROUPS

(75) Inventors: Juan A. Lence Barreiro, Santiago de Compostela (ES); Harry Z. Huang, Plainville, CT (US); Chouhwan Moon, Glastonbury, CT (US); Gary L. Freeland, Plainville, CT (US); Robert H. Mashiak, Somers, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/567,845

(22) Filed: May 9, 2000

(51) Int. Cl.[7] ........................................................ B66B 3/00
(52) U.S. Cl. ............................................ 187/393; 187/247
(58) Field of Search .................................... 187/391, 393, 187/247, 248

(56) References Cited

U.S. PATENT DOCUMENTS

| | | | |
|---|---|---|---|
| 4,512,442 | * | 4/1985 | Moore et al. ........................ 187/29 R |
| 4,697,243 | * | 9/1987 | Moore et al. .......................... 364/513 |
| 4,698,780 | * | 10/1987 | Mandel et al. ........................ 364/550 |
| 4,750,591 | * | 6/1988 | Coste et al. ............................ 187/130 |
| 4,823,914 | * | 4/1989 | McKinney et al. .................... 187/133 |
| 4,898,263 | * | 2/1990 | Manske et al. ....................... 187/133 |
| 5,736,694 | * | 4/1998 | Ketoviita ............................... 187/391 |

* cited by examiner

Primary Examiner—Jonathan Salata

(57) ABSTRACT

Elevator events and conditions are monitored so as to determine features which are notable with respect to service including repair and maintenance, a name label is stored chronologically in a log upon each occurrence of a notable feature. Attributes of the feature stored chronologically with the feature, may include the date and time, the duration of the feature or a preceding condition, the point of time in a run when the notable feature occurred, the direction of elevator car travel and the floor location of the elevator related to the notable feature. Separation markers are generated to separate notable features which relate to each other from those that do not, each marker having floor number, time and date stamps and the duration between the first feature related thereto and the last feature related thereto stored chronologically therewith. Features include door reversals, loss of non-door safeties, failure making door lock switches, door rebound, doors open too long, and doors open in flight.

23 Claims, 9 Drawing Sheets

US 6,330,936 B1

ELEVATOR BEHAVIOR REPORTED IN OCCURRENCE-RELATED GROUPS

RELATED APPLICATIONS

Related subject matter is disclosed in U.S. patent application Ser. No. 09/567,837 filed contemporaneously herewith.

TECHNICAL FIELD

This invention relates to monitoring elevator operation, and providing informative indications of notable features and related attributes separated in terms of related occurrences.

BACKGROUND ART

The monitoring of elevator operation for maintenance and repair purposes has long been known. Typically, counters may record the number of runs, the number of times a door opens or closes, loss of safeties, and the like. In some cases, the data is reduced by statistical means, such as providing the mean time to open a door or other event, coupled with a normal variance thereof. Frequently, this approach will mask data that is significant in maintaining and servicing elevators; the data is difficult to understand and apply to elevator servicing; and it has been found to be of little value in resolving elevator problems during repair. The use of present-day elevator monitoring systems has been shown to result in many unnecessary service calls, and when the service personnel arrives at the elevator, the information does not significantly help in pointing to the problem. All of these problems are further compounded when the elevator is operating normally at the time that the service personnel arrives.

DISCLOSURE OF INVENTION

Objects of the invention include provision of improved analysis of elevator operating data to trigger service calls; providing elevator operation messages that more closely relate to real elevator problems; minimizing data storage requirements in elevator monitoring; providing elevator maintenance information which is simple to understand and can be managed easily by service personnel; providing elevator information which can be managed easily by service personnel without the help of an analysis tool, such as a microcomputer; providing improvements in information which may be used for routine maintenance as well as for servicing failures.

According to the present invention, parameters of an elevator, including conditions and events, are monitored, and when such parameters are notable, as having significance in maintenance or repair, a feature is recorded in a chronological log together with related attributes. Examples of related attributes are date and time, duration of the event or of a related factor, the floor number where the elevator was when the feature occurred, and direction of car movement. All of the recorded features which relate to each other are separated from unrelated recorded features of a similar or other type by means of separation markers which include time and date stamps, the duration of related features, and a floor number. Examples of features which are recorded are door reversals, loss of safeties, either while at a landing or while in flight, doors not locking, doors opening in flight, door rebound, and doors being open too long.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 9:
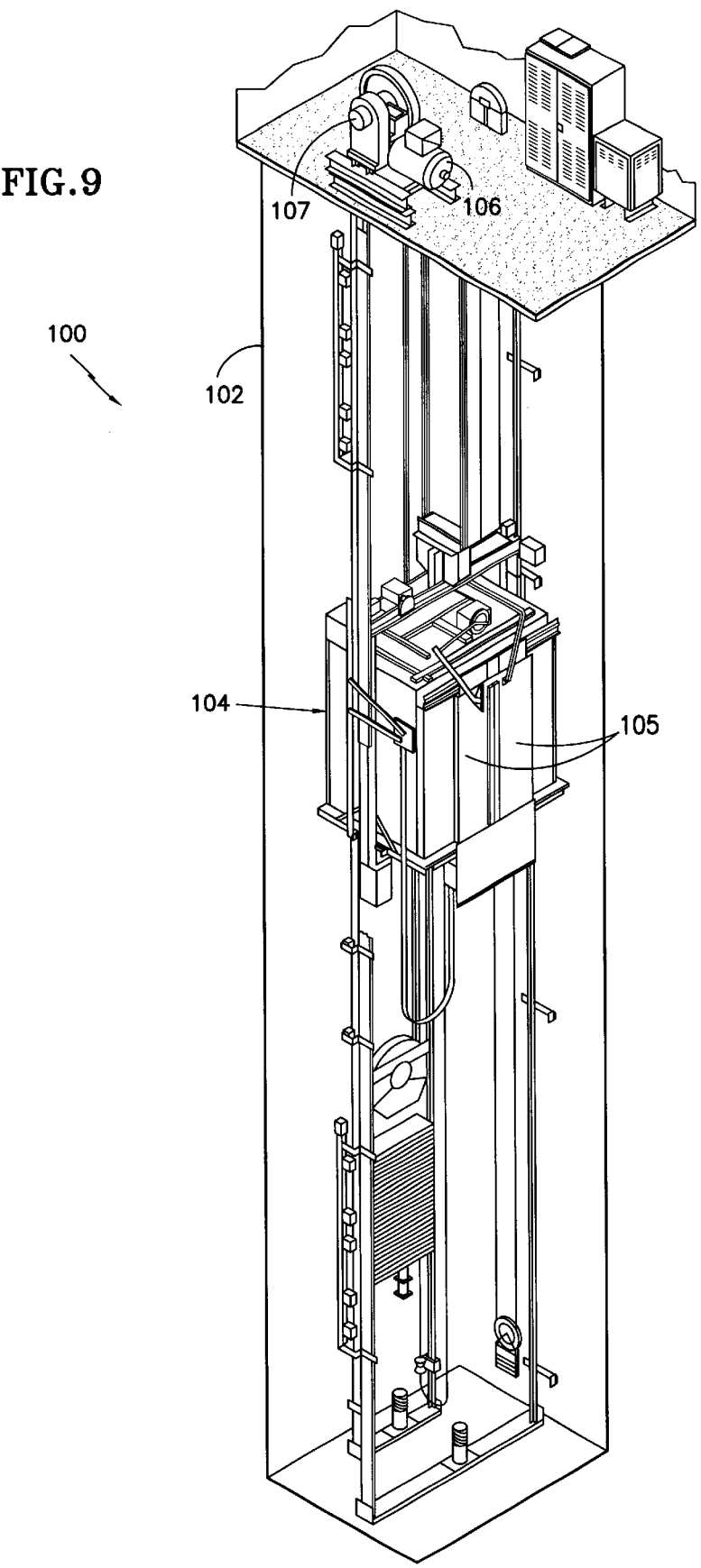
FIG. 9 is a perspective view of an elevator system with which the invention may be used.

In FIG. 9, an elevator system 100, with which the invetnion may be used, includes a shaft 102 within which an elevator 104 having doors 105 is moved vertically by a motor 106 including a brake 107.

Figure 1:
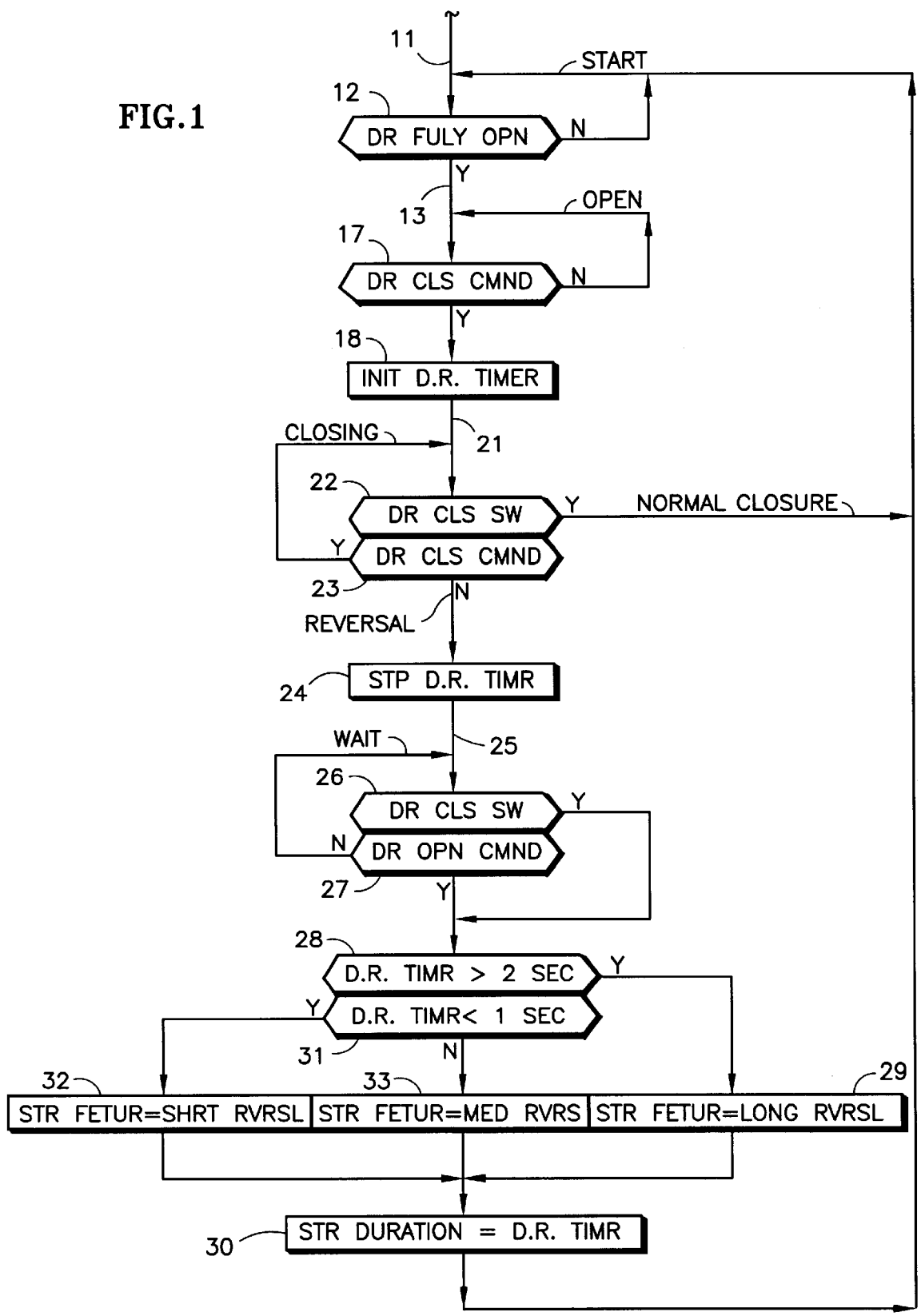
FIG. 1 is a high level logic flow diagram of functions that may be performed to determine door reversals.

An example of a function which the present invention may monitor is door operation, and an example of a related feature is a door reversal. Exemplary routines of the invention for recognizing and recording door reversals and loss of safeties operate continuously, whenever the corresponding elevator apparatus is operating, as one of many routines operating simultaneously as parallel processes. FIG. 1 is an example of an attribute stored with a corresponding feature, in which the duration is of a factor, time since door closure is commanded when the feature, door reversal, occurs. Upon power up, following initialization, the routine will be entered in a start state 11 and will repetitively cycle through a negative result of a test 12 until such time as the elevator door is fully open. Then an affirmative result reaches an open state 13 in which the routine will continuously cycle through a negative result of a door close command test 17, until there is a door close command. Then, a step 18 will start a door reversal timer; if a normal closure occurs, the starting of the door reversal timer will have been unnecessary; but if there is a door reversal, then the important thing to know is how soon the door reversed after the door was commanded to close. As the door is closing, the routine cycles within a closing state 21 in which a test 22 determines if the door closed switch is operated or not. If the switch is operated, this represents a normal closure which causes the routine to revert to the start state 11. This is a case where the event did not result in a feature, so the event is ignored entirely.

If test 22 is negative, then a test 23 determines if a door close command is present or not. If there is a door close command, that means that the door continues to be closing, so an affirmative result causes the routine to remain in the closing state 21. If the door close command ceases—which could be because of someone pressing the door open switch button, or operation of a door safety switch, such as a between-door presence detector, or if there is some sort of failure—in which case, a negative result of test 23 reaches a step 24 to stop the door reversal timer. This setting of the door reversal timer indicates the period of time during which the door motor was powered to close the door. After that, the routine is in a wait state 25 in which it cycles through negative results of a pair of tests 26, 27 until such time as either the door closed switch is operated, such as because a passenger may have forced the door closed to get the elevator to start, or there is a door open command, which the controller would issue after operation of the door open switch or a door safety switch. When the door closing event is ended, either by virtue of the door closed switch operating after loss of the door close command, as indicated in test 26 or by virtue of a true reversal resulting in a door open command, as indicated in test 27, a test 29 determines if the door reversal timer has reached more than 20 seconds. If so, a step 29 will cause a feature identified with the name label "long reversal" to be stored, and then a step 30 causes the door reversal timer to be stored along with it by a step 33, so as to be chronologically related to the feature, as seen in Table 1. If the door reversal timer is set to less than 20 seconds, then a test 31 determines if it is set to less than one second. If so, a step 32 causes a feature to be stored with the name label "short reversal" and the door reversal timer setting is stored with it by a step 30. But if test 31 is negative, then a step 33 causes a feature to be stored with the name label "medium reversal". After the door reversal timer is stored by step 30, the routine of FIG. 1 reverts to the start state 11.

Figure 2:
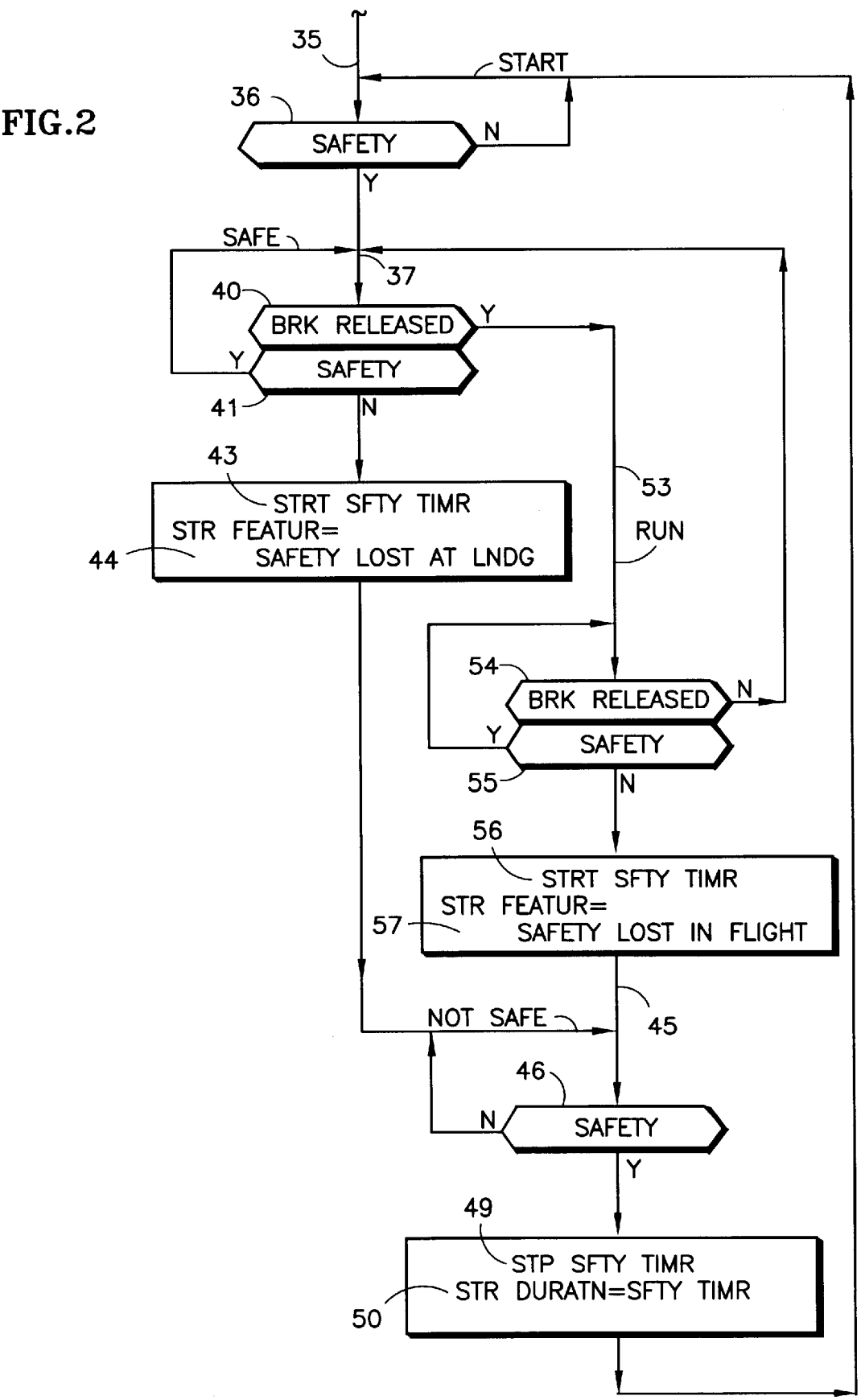
FIG. 2 is a high level logic flow diagram of functions that may be performed to determine loss of non-door elevator safeties.

An example of a condition which the invention may monitor and record is the non-door portion of the elevator safety chain ("safeties"). Examples of status indications within the non-door portion of the safety chain, as is known, include the overspeed governor, the final limit switches, and the governor safeties. In FIG. 2, the term "safety" herein refers to all of the safety chain except for

TABLE 1

| Date | Time | Feature ID | Floor # | Direction | Duration | Flight time |
|---|---|---|---|---|---|---|
| 08/09/98 | 23:14:22.644 | End Marker | 0 | 0 | 6089.22 | |
| | | Door open in flight, ADS | 0 | 0 | 4.64 | 2.93 |
| 08/19/98 | 10:46:30.304 | End Marker | 0 | 0 | 6.89 | |
| | | Failure making DS | | | 2884.96 | |
| 08/26/98 | 23:11:48.845 | End Marker | 11 | 0 | 2936.58 | |
| | | Failure making DS | | | 11.22 | |
| | | Failure making DS | | | 2.79 | |
| | | Failure making DS | | | 1.94 | |
| | | Failure making DS | | | 6223.43 | |
| 09/01/98 | 16:47:40.725 | End Marker | 6 | 0 | 6375.4 | |
| | | Door open in flight, GS | 11 | 0 | 1.42 | 2.65 |
| 09/06/98 | 10:19:49.105 | End Marker | 11 | 0 | 3.25 | |
| | | Door reversal, medium | | | | 0.43 |
| 09/11/98 | 18:42:12.134 | End Marker | 0 | 0 | 4.62 | |
| | | Door reversal, long | | | | 3.34 |
| 09/12/98 | 21:17:07.845 | End Marker | 2 | 0 | 6.53 | |
| | | Door open in flight, GS | 7 | 0 | 1.11 | 0.22 |
| 09/19/98 | 13:24:54.325 | End Marker | 8 | 0 | 3.12 | |
| | | Door open in flight, ADS | 0 | 0 | 49.76 | 1.24 |
| 10/02/98 | 11:47:13.034 | End Marker | 0 | 0 | 56.65 | |
| | | Lost SAF in flight | 2 | 0 | 0.49 | 0.29 |
| 10/02/98 | 11:50:02.815 | End Marker | 9 | 1 | 2.6 | |
| | | ADS rebound | | | | 2 |
| 10/02/98 | 12:01:52.634 | End Marker | 1 | 0 | 0 | |
| | | ADS for too long | | | 169.78 | |
| 10/02/96 | 12:03:43.325 | End Marker | 1 | 0 | 172 | |
| | | Failure making GS | | | 4.48 | |
| 10/12/98 | 21:06:09.235 | End Marker | 3 | 0 | 6.58 | |
| | | Failure making DS | | | 1.28 | |
| 10/28/98 | 15:02:04.544 | End Marker | 0 | 0 | 4.23 | |
| | | ADS rebound | | | | 1 |
| | | ADS open for too long | | | 1250.18 | |
| 11/10/98 | 12:40:52.855 | End Marker | 5 | 0 | 1255.53 | |
| | | Failure making GS | | | 0.34 | |
| 12/04/98 | 18:20:55.384 | End Marker | 0 | 0 | | |
| | | Door open in flight, GS | 8 | 0 | 0.14 | 3.87 |
| 12/20/98 | 20:01:35.154 | End Marker | 8 | 0 | 3.85 | |
| | | Failure making DS | | | 1.3 | |
| 12/21/98 | 16:12:46.605 | End Marker | 0 | 0 | 4.12 | |
| | | Door open in flight, GS | 9 | 0 | 1.6 | 1.15 |
| 12/26/98 | 22:01:42.835 | End Marker | 9 | 0 | 3.82 | |
| | | Short reversal | | | | 1.47 |
| | | Medium reversal | | | | 2.8 |
| | | Short reversal | | | | 1.22 |
| | | Short reversal | | | | 1.12 |
| 12/28/98 | 12:22:00.955 | End Marker | 6 | 0 | 42.56 | | the door safeties, because if the door safeties were included in the routine of FIG. 2, every normal elevator stop, when the door switch indicates that the elevator door is not fully closed, would be recorded as a feature. In FIG. 2, with power on and initialization complete, the "loss of safeties" routine begins in a start state 35 which reaches a test 36. When the safety chain is complete, an affirmative result of test 36 causes the routine to reach a safe state 37. In this state, a test 40 determines if the car is running or stopped. If the brake is not released, then the elevator is stopped, and a test 41 determines if the non-door safety chain is complete, or not. If it is, the routine remains in the safe state 37. But when the non-door safety chain is no longer complete, a negative result of test 41 reaches a step 43 to start a safety timer, and a step 44 to store a feature with the name label "safety lost at landing". Then the routine enters a not safe state 45 in which it cycles through a test 46 to determine if the non-door safety chain is fully made, or not; so long as the non-door safety chain is not complete, the routine remains in the not safe state 45. But once the non-door safety chain is again made, an affirmative result of test 46 reaches a step 49 which stops the safety timer and a step 50 which stores the safety timer. The safety timer thus is an example of a duration signal being recorded which is in fact the duration of the feature itself (loss of safeties). The length of time that safeties are lost is an indication of the severity of the problem.

If the brake is released (not engaged), the elevator is running, and an affirmative result of test 40 will place the routine of FIG. 2 into a run state 53. In this state, a test 54 determines if the brake is still released, and if it is not, the routine reverts to the safe state; the elevator is always safe when the brake is not released. But if the brake is still released, then a test 55 determines if the non-door safety chain is complete, or not. So long as it is, the elevator is running safely. In the normal case, the run state will cycle through affirmative results of tests 54 and 55 until the elevator car stops at a landing, which results in test 54 being negative to return to the safe state 37. Should there be a failure of the non-door safety chain while the car is running, a negative result of test 55 reaches a step 56 to start the safety timer and a step 57 to store a feature with the name label "safeties lost in flight". Then the not safe state 45 is reached, as described hereinbefore.

Feature names and durations represented by timer values, as described with respect to FIGS. 1 and 2, are stored into the chronological log (data base) which includes a primary aspect of the present invention: a separation marker to separate related features into groups. The scheme of separation between related features by means of markers is based on identifying an elevator event, or a time delayed from an elevator event, that indicates the end of a current sequence of notable features which may be related to a common causation (the end of a feature space). For door reversals and loss of non-door safeties, the feature space ends based upon time elapsed following an operational condition of the elevator, the time being shortest when the elevator is running, and slightly longer when the elevator is parked with the door closed, and much longer when the elevator is parked with the door open. If during the related lapse the operating condition changes, then the timer is restarted. Therefore, a series of related features which occur within what is considered to be relevant conditions of operation will be stored together between markers, and those features which occur separated by changes in elevator operating conditions so as to be considered to be causally unrelated will be on opposite sides of a marker (Table 1).

Figure 3:
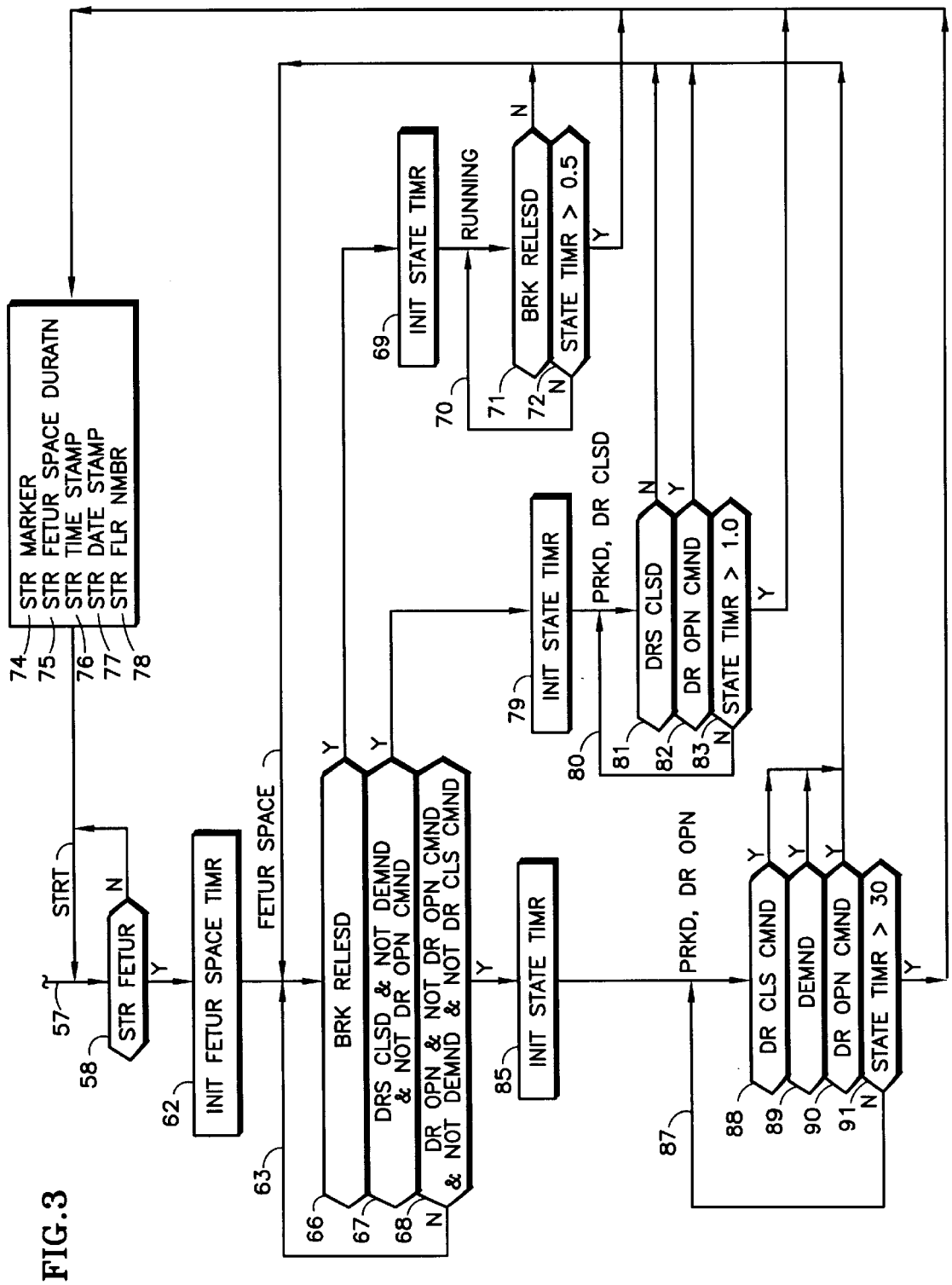
FIG. 3 is a high level logic flow diagram of functions which may be performed to generate markers to separate door reversal, safety and other features which relate to each other from those that may not.

Following initialization after power is applied, the routine of FIG. 3 will begin in a start state 57, which monitors a test 58 to determine any time when a feature is generated and stored, such as in steps 32, 44, or 57. So long as all the events and conditions in the elevator are not notable, test 58 will be negative, thereby causing the routine to remain in the start state 57. Whenever a feature is stored as described hereinbefore, then test 58 will be affirmative reaching a step 62 to start a feature space timer, which is an attribute that becomes part of the recorded data. The routine of FIG. 3 is then in a "feature space" state 63, wherein the routine may note various conditions and shift between a running state, a parked with door closed state, and a parked with door open state and then, await the passage of the aforementioned times. A series of tests 66, 67, 68 try to determine one of the states: running, parked with door closed, or parked with door open; when the door is in the process of opening or closing, none of those states will exist so the related feature space states 63 will simply cycle through negative results of tests 66, 67 and 68. A test 66 determines if the brake is released, and if it is, a step 69 starts a state timer, reaching a test 71 which again determines if the brake is released. Initially it usually will be, so a test 72 will determine if the state timer has exceeded half of a second, or not. If not, the routine remains in the running state, cycling through an affirmative result of test 71 and a negative result of test 72. If the brake is engaged, the timer is restarted, so it is possible to remain in the running state 70 for more than half a second. But if the brake is not engaged, the half second will elapse so an affirmative result of test 72 will reach a set of steps 74–78 to store the marker, the feature space duration initiated at step 62, a time stamp, a date stamp and the floor number where the car is stopped. On the other hand, if the brake is engaged before the expiration of one-half second following the last time that it was released, then a negative result of test 71 returns the routine to the feature space state 63. Notice that successive occurrences of loss of safeties can occur within one marker space because the brake will be engaged causing the return to the relates feature grouping state 63, test 66 will be negative, and the presence of demand will cause tests 67 and 68 to be negative. Thus, the feature space will continue until the safeties are restored, the brake is released, and 0.5 seconds elapse. Then, an affirmative result of test 72 will reach a series of steps 74–78 which will store a marker in the log, store the feature space duration, store the time stamp and a date stamp, and store the floor number of the committable floor of the elevator at that time.

If test 66 is negative and test 67 is affirmative, then the routine of FIG. 3 reaches a step 79 to initialize the state timer and then enters a parked, door closed state 80, where it will remain as long as tests 81–83 are negative, meaning that the door closed switch did not open, there is no door open command, and it has not been more than one second since entering the parked, door closed state. If test 81 is negative or test 82 is affirmative, this means the door is no longer fully closed, and the routine will return to the feature space state 63. But if a full second expires after entering this state, an affirmative result of test 83 reaches the steps 74–78 to store a marker, a duration, the time stamps and the floor number, as in Table 1.

If both tests 66 and 67 are negative, but test 68 is affirmative, then a step 85 initiates the state timer and a parked, door open state 87 is reached. Therein, three tests 88–90 determine when the door is no longer open. Whenever there is a door close command or demand, the doors will close, so an affirmative result of tests 88 or 89 will return to the feature space state 63 so as to be able to reach test 67 to switch into the door closed state 80. If there is a door open command, this indicates that there is no steady condition in the elevator, so that more related notable events may occur. Therefore, the routine returns to the feature space state 63. When tests 88–90 are negative, a test 91 determines if 30 seconds has elapsed since entering the parked, door open state. If not, the routine remains in the parked, door open state 87. Eventually, 30 seconds will elapse since entering that state, so an affirmative result of test 91 will reach the steps 74–78 to store a marker, feature space duration, time and date stamps, and floor number, as shown in Table 1.

Figure 4:
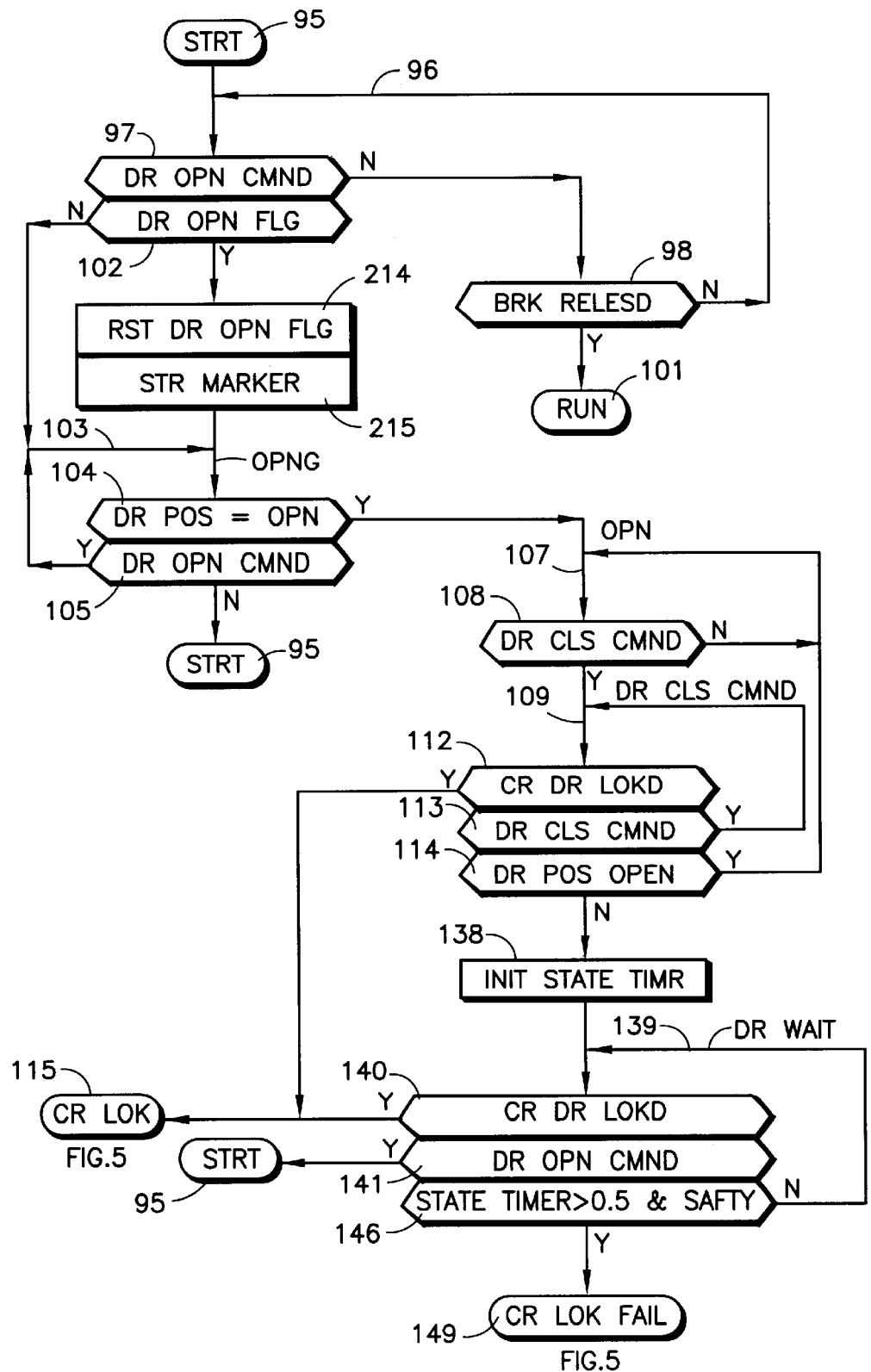
FIGS. 4 and 5 are high level logic flow diagrams of functions that may be performed to determine failure of door locks, and to generate markers to separate various features which relate to each other from those that may not.
Figure 5:
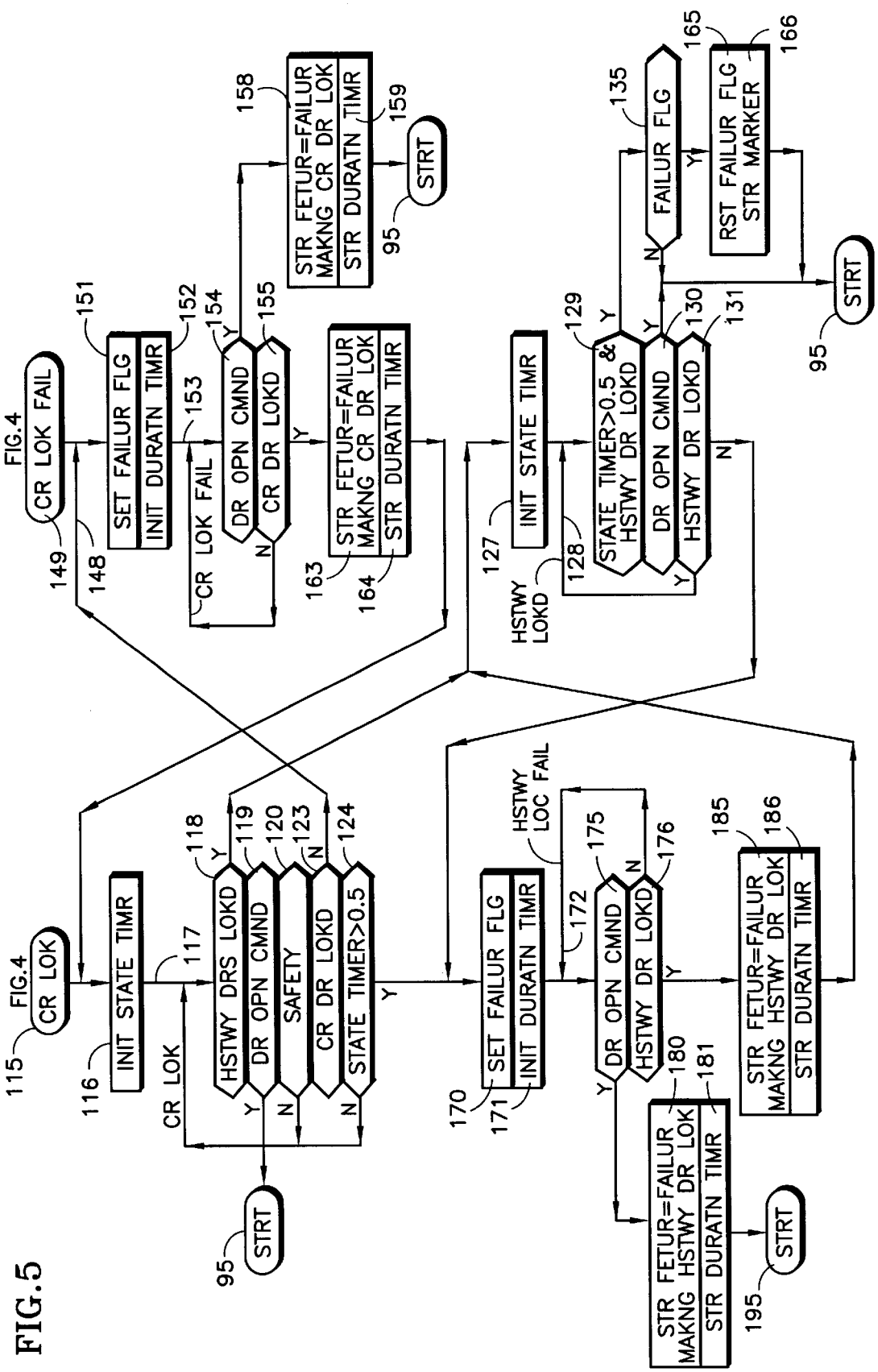

Another example of notable events recorded and separated with markers according to the present invention is illustrated in FIGS. 4 and 5. In FIG. 4, a routine, after initialization, will reach a start state 96 through a transfer point 95. Assume that the elevator is at a landing with its doors open: in such a case, there will not be a door open command, so a test 97 will be negative, and the brake will be engaged, so a brake released test 98 will also be negative, causing the routine to remain in the start state. Eventually, the doors will close and the brake will be released, so that an affirmative result of test 98 will reach a run subroutine through a transfer point 101, as is described with respect to FIG. 6, hereinafter. As the elevator approaches a landing, there will be a door open command which causes the routine to return from the run subroutine to the start state 96 and to pass through a now-affirmative test 97 to reach a test 102 to determine if a door open flag was set in the run subroutine, as described hereinafter. Assuming not, a negative result of test 102 reaches an opening state 103 which will cycle through a pair of tests 104, 105 until either the door becomes fully opened or the door open command ceases. Normally the door will become fully open before the door open command ends, so that if the door is not opened by the time the door open command ends, a negative result of test 105 will cause the routine to revert to the start state 96. Normally, the door position indicator will indicate that the door is open, so an affirmative result of test 104 will reach an open state 107 where the routine will remain all of the time until the door is commanded to close. When the door is commanded to close, an affirmative result of a test 108 will reach a door closed commanded state 109. As the door is closing, a test 112 will be negative and a test 113 will be affirmative causing the routine to remain in the door close commanded state 109. However, if the car door is not locked by the time the door close command ends, it may be because there is a door reversal. In that case, the door will eventually be open so a test 114 will be affirmative reverting the routine to the open state 107. Assuming there is no door reversal, eventually the door should be fully closed so that the car door will be locked (and the locked switch will operate) causing an affirmative result of test 112. In that case, the routine will pass through a transfer point 115 to FIG. 5, where a step 116 initiates a state timer and the routine enters a car lock state 117. A test 118 determines if the hoistway doors are locked; normally they will not initially be so a test 119 will determine if there is a door open command. In a typical case, there will not be so a test 120 determines if the safeties are still intact. Assuming that they are, a test 123 determines if the car doors are still locked, and if they are, a test 124 determines if a half second has elapsed since entering the car locked state 116. Initially, it will not have, so a negative result of test 124 causes the routine to revert to the car locked state 117. In a normal case, before 0.5 seconds have elapsed, the hoistway doors will also become locked, so that an affirmative result of test 118 will cause a step 127 to initiate a state timer and the routine enters a hoistway locked state 128. A test 129 determines if the hoistway doors are still locked after the state timer exceeds a half second. The 0.5 second delay is to ensure that the elevator system has reached a stable condition with all of the doors suitably locked. Initially, a half second will not have expired, so a negative result of test 129 reaches a test 130 to determine if there is a door open command. If not, a test 131 determines if the hoistway doors are still locked. In a typical case, the hoistway doors will remain locked for more than 0.5 seconds so that an affirmative result of test 131 will again reach the hoistway locked state 128 and the test 129 will be affirmative, reaching a test 135 to see if a failure flag has been set. Under the normal conditions described hereinbefore, there will be no failure flag so a negative result of test 135 causes the program to revert to the start state in FIG. 4 through a transfer point 95. This then is the normal condition of both the car doors and hoistway doors being locked.

In FIG. 4, now assume that the car door is not locked so test 112 is negative, the door close command has ended so that test 113 is negative, and there has not been any condition to cause the door to become open, so that test 114 is negative. A negative result of test 114 will cause a step 138 to initiate a state timer and the routine enters a door wait state 139. If the car door does become locked, then an affirmative result of a test 140 will cause the program to transfer to the car locked state in FIG. 5 through the transfer point 115 as described hereinbefore. But if test 140 is negative, a test 141 will determine if a door open command is present. Whenever the car doors do not become locked, the elevator will not move, and frequently passengers will push the door open command button in the elevator to try to make something happen. In such a case, an affirmative result of test 141 will cause the program to revert to the start state through the transfer point 95. So long as the safeties are intact and the state timer has not exceeded one-half second, a test 146 will cause the routine to revert to the door wait state 139. Eventually, if there is no door open command and the car door does not lock, an affirmative result of test 146 will cause the routine to reach a car lock fail state 148 in FIG. 5 through a transfer point 149. This establishes an absolute condition of a car lock failure. A step 151 will set the failure flag (used at test 135 described hereinafter to set a marker). A step 152 initiates a duration timer which will indicate the time during which the car door lock switch remains open. Then, the routine enters a car lock fail state 153 which causes the routine to cycle through a test 154 to sense a door open command, and a test 155 to see if the car door remains in the unlocked state. If a passenger presses the door open switch button, or activates the passenger door safety switches between the doors, an affirmative result of test 154 will cause the feature "failure making car door lock" to be stored along with the setting of the duration timer in steps 158, 159. Then, the routine reverts to the start state of FIG. 4 through the transfer point 95. At this juncture, a feature has been stored, but conditions are such that it cannot now be determined whether or not there will be more related failures. Therefore, a marker is not stored at this point.

Assume that the routine is in the car lock fail state 153, but that the car doors become locked, which may occur by virtue of a passenger pressing both doors toward each other with his hands. An affirmative result of test 155 will reach steps 163, 164 to store the feature "failure making car door lock" and the corresponding duration during which the car door lock remained unlocked. In this state, no marker is stored because it cannot yet be known whether more related events will occur. Following step 164, the program reverts to the step 116 to initiate a state timer and enter the car locked state 117. Operation proceeds as before; assuming that the hoistway doors become locked within 0.5 seconds of entering this state (they may already be locked), an affirmative result of test 118 passes through step 127 to enter the hoistway locked state 128. If the hoistway doors remain locked for 0.5 seconds, an affirmative result of test 129 reaches test 135. Because the failure flag was set in step 151, test 135 will be affirmative reaching a step 165 to reset the failure flag, and a step 166 to store a marker, along with the feature space duration, time and date stamp, and car floor position number, as illustrated by steps 75–78 of FIG. 3 but omitted here for clarity. This marker will appear in the log next after the feature "failure making car door lock".

If the car door never becomes locked, the car lock fail state 153 will continue until there is a door open command and an affirmative result of test 154, as described hereinbefore.

Assume that the routine has entered the car locked state 117, there is no door open command, the safeties are intact, and the car door remains locked. If this condition continues for a half second without the hoistway doors being locked, then an affirmative result of test 124 will reach a step 170 to set the failure flag and a step 171 which initiates the duration timer, so as to provide an indication of the length of time during which the hoistway doors remain not locked. Then the routine enters the hoistway lock fail state 172, in which it waits for the hoistway doors to become locked, or a door open command. Until either of those conditions occur, tests 175 and 176 will be negative causing the routine to remain in the hoistway lock fail state 172. If the hoistway doors never become locked, then the hoistway lock fail state 172 will be exited when, eventually, a door open command will cause an affirmative result of test 175, which will cause a step 180 to store a feature "failure making hoistway door locks", and a step 181 to store the setting of the duration timer. Then the program reverts to the start state of FIG. 4 through the transfer point 95. But if the hoistway doors do eventually become locked, an affirmative result of test 176 reaches a step 185 to store the feature "failure making hoistway door locks" and a step 186 which stores the duration timer. Then the routine advances through the step 127 to the hoistway locked state 128 as described hereinbefore. If the hoistway doors remain locked for 0.5 seconds, this will cause an affirmative result of test 129 to reach test 135 which will also be affirmative because the failure flag was set in step 170. This causes step 165 to reset the failure flag and step 166 to set a marker, indicating that the door lock experience is over with.

Figure 6:
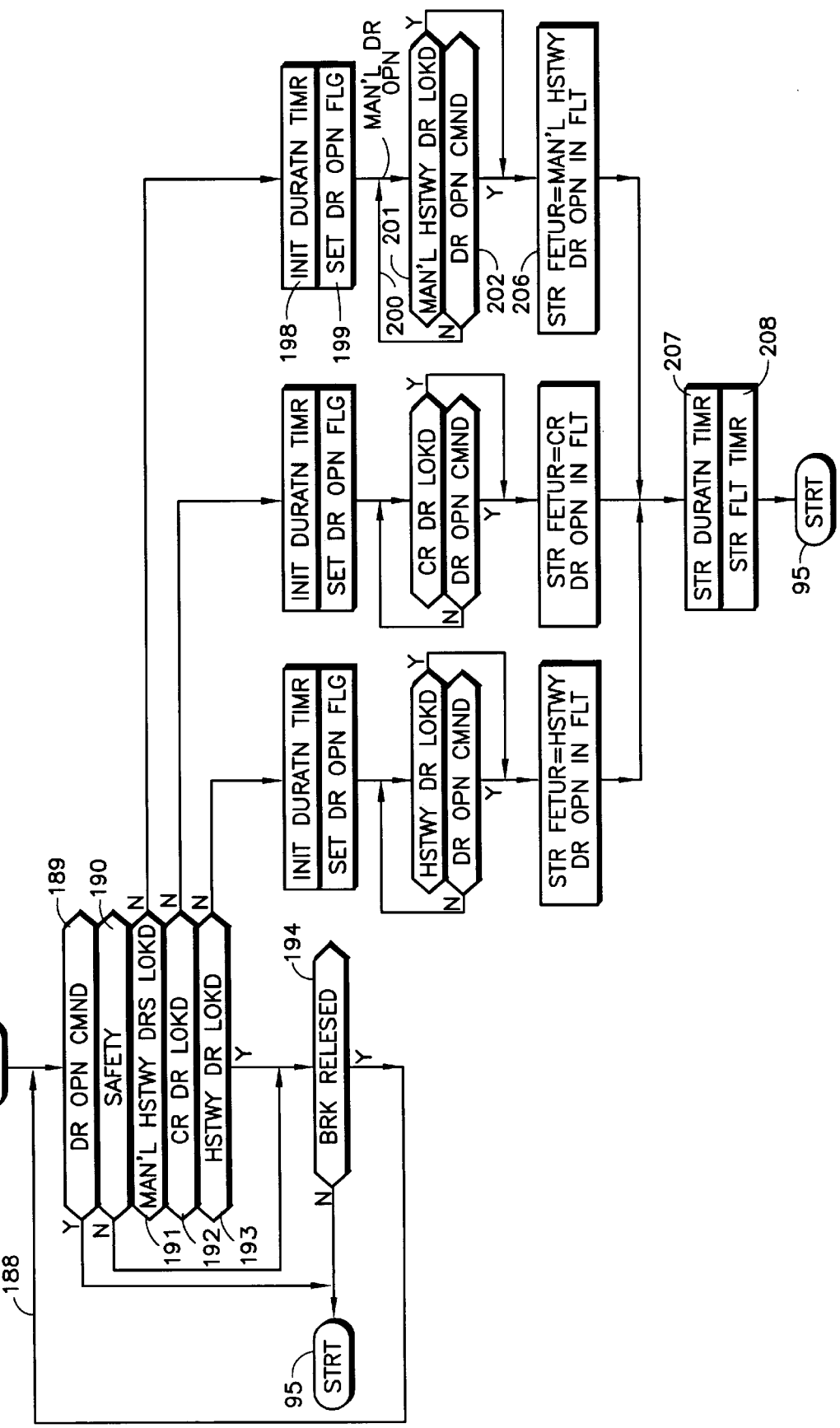
FIG. 6 is a high level logic flow diagram of functions which may be performed to determine doors open in flight.

In FIG. 4, in the start state 96, when the doors close and the brake is released for a run, an affirmative result of test 98 reaches the run state in FIG. 6 through the transfer point 101. During a normal run, there will be not be a door open command so a test 189 will be negative, the safeties will remain intact so a test 190 will be affirmative, the manual hoistway doors, car doors and hoistway doors will remain locked so tests 191–193 will all be affirmative, the brake will remain released so test 194 is affirmative, and the routine remains in the run state 188. At the end of the run, when the door zones are reached, the test 189 will become affirmative causing the program to revert to the start state of FIG. 4 through the transfer point 95. On the other hand, if the run is aborted for some reason, then the brake may be engaged so that test 194 is negative, reaching the start routine through the transfer point 95.

If during a run any door lock switches become disengaged, one of the tests 191–193 will be negative, reaching a corresponding state of the routine. If the manual hoistway door lock switches become disengaged, test 191 will be negative, reaching a step 198 which initiates a duration timer, and a step 199 which sets a door open flag used hereinafter, similar to the failure flag described hereinbefore. Then the routine enters the manual door open state 200 which continues until either the manual hoistway doors become locked, at test 201 or there is a door open command, indicating the end of the run, at test 202. When one of these events occur, a step 206 will store a feature "manual hoistway door open in flight" a step 207 will store the duration timer indicative of how long the door was open, and a step 208 will store the flight time, which is the point in time, after the elevator left the door zone, at which the door opened, as is described with respect to FIG. 8, hereinafter. Then, the program reverts to the start state of FIG. 4 through the transfer point 95. In FIG. 4, as the elevator reaches the door zone near the end of the run, there will be a door open command so there is an affirmative result of test 97. Since the door open flag was set in step 199 of FIG. 6, an affirmative result of test 102 reaches a step 214 to reset the door open flag and a step 215 which stores a marker, along with the feature space duration, time and date stamp, and car floor number, as illustrated by steps 75–78 in FIG. 3 but omitted here for clarity. In this case, the marker is set because the end of the trip within which a door opened is deemed to be the end of any sequence of operation with related, notable events.

In FIG. 6, should either the car door lock switch or the hoistway door lock switch become disengaged while the elevator is in flight, tests and steps similar to the tests and steps 198–206 as well as the steps 207 and 208 will cause appropriate features "car door open in flight", "hoistway door open in flight", and a marker to be stored.

As used herein, the reference to doors being locked or not refers to the door lock switches being engaged, or not. When signals indicate that a particular door lock switch is engaged, then the door is referred to herein as being locked; when signals indicate that a door lock switch is not engaged, then the door is referred to herein as being unlocked or not locked. Of course, a door reversal which occurs during door closure ends the closure and causes the door to open. Reference to doors being open in flight refers to switches not being engaged: either switches indicating that the door is closed and locked, or switches indicating that the position of the door is fully closed. Thus, failure of making a door lock, a door being opened in flight, a door rebounding, or a door open too long simply refers to the door not being indicated as completely closed and/or locked.

Figure 7:
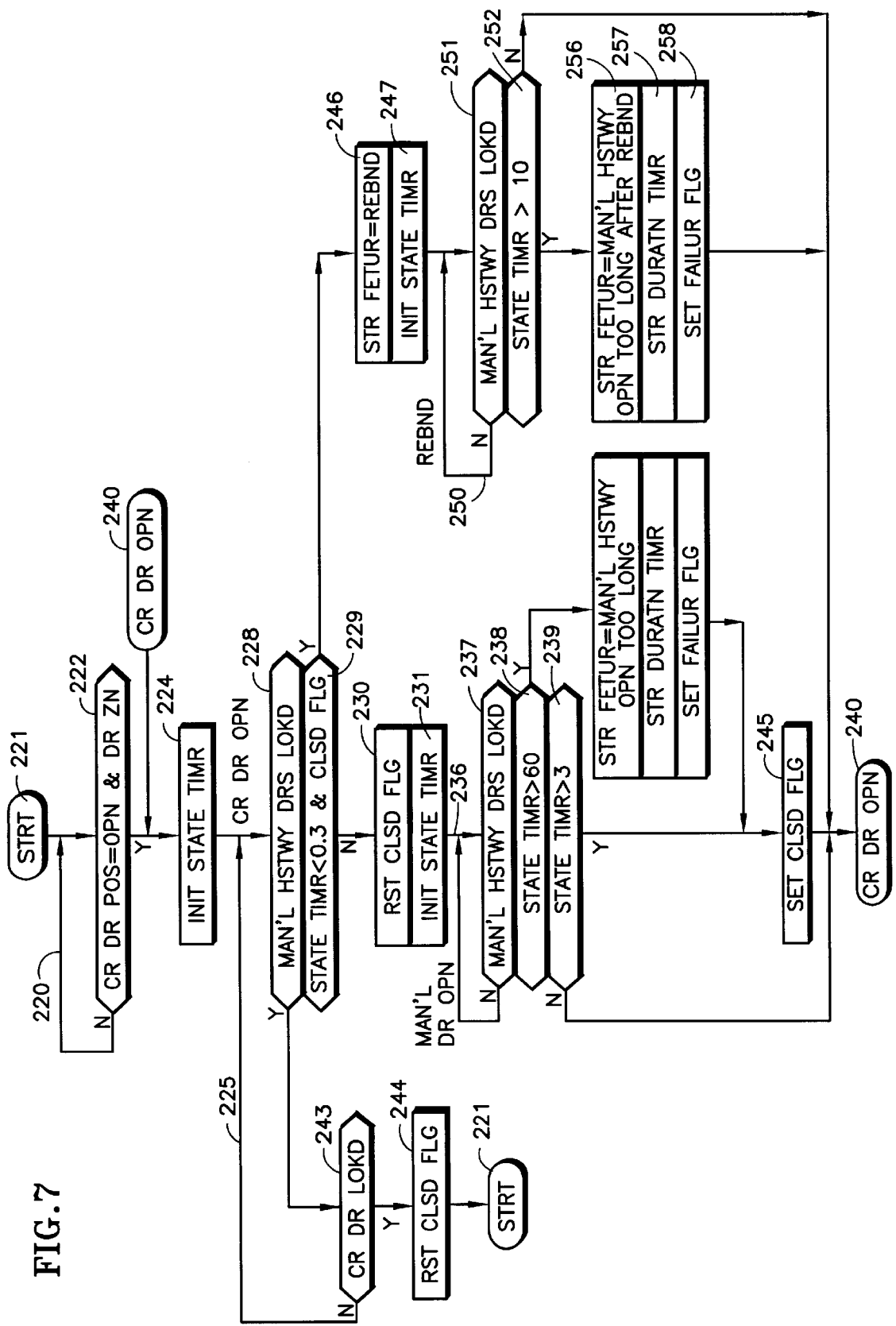
FIG. 7 is a high level logic flow diagram of functions which may be performed to determine door rebound and doors open too long.

Other features which may be recognized and stored in the log relate to manual hoistway door rebounding, or being open too long, or both. In FIG. 7, after initialization, the routine will reach a start state 220 through an entry point 221. A test 222 determines if the car door is open concurrently with the car being within a door zone, meaning that it is at a landing with its doors open. Until such is the case, the start state 220 will continue. When the doors are open in the door zone, an affirmative result of test 222 reaches a step 224 to initiate a state timer, and then a car door open state 225 is reached. Initially, a test 228 will be negative because the car door position is open so the manual hoistway doors are also open. A test 229 will initially be negative because a closed flag, referred to hereinafter, cannot have been set until certain portions of the routine are operative. A negative result of test 229 reaches a step 230 to reset the closed flag (redundantly at first, but to assure that it is reset at this point in the program). Then a step 231 initializes a state timer, and the routine reaches the manual doors open state 236. The routine will remain in this state until the manual hoistway doors become locked, as indicated by a test 237. When the manual hoistway doors eventually become locked, which may be within a second or so, or may be after service by a repairman, requiring several hours, an affirmative result of test 237 reaches a test 238 to determine if the state timer has exceeded 60 seconds. If it has not, a test 239 determines if the state timer has exceeded three seconds. If not, this is a normal closure and a negative result of test 239 passes through the transfer point 240 to initiate the state timer at step 224 and reach the car door open state 225. This time, test 228 will be affirmative, reaching a test 243 to determine if the car door is still locked. If it is, an affirmative result of test 243 reaches a step 224 to reset the closed flag and causes the program to revert to the start state 220 through a transfer point 221. The normal routine just described has not encountered any notable features, so nothing has been stored in the log.

Assume that the routine is in the manual doors open state 236 and the manual hoistway doors become locked within 60 seconds but more than three seconds of entering that state. Then an affirmative result of test 239 will reach a step 245 to set the closed flag, and the program will pass through the transfer point 240 to initiate the state timer in the step 224 and reach the car door open state 225.

If the manual hoistway doors rebound, and become open, test 228 will be negative but this time test 229 will be affirmative if the state timer is less than 3/10 of a second. This reaches a step 246 to store the feature "rebound", a step 247 to initiate a state timer, and then the rebound state 250, which will continue until the manual hoistway doors become locked. Thereafter, a test 251 will be affirmative reaching a test 252 to determine if the state timer has exceeded ten seconds or not. If it has not, a negative result of test 252 causes the door open state to be resumed as described hereinbefore. But if the timer is over ten seconds, a test 256 will store the feature "manual hoistway open too long after rebound", a test 257 will store the duration timer, which is initialized in either step 152 or step 171 of FIG. 5, and a step 258 will set the failure flag, which is the same failure flag set in step 151 or step 170 in FIG. 5.

Figure 8:
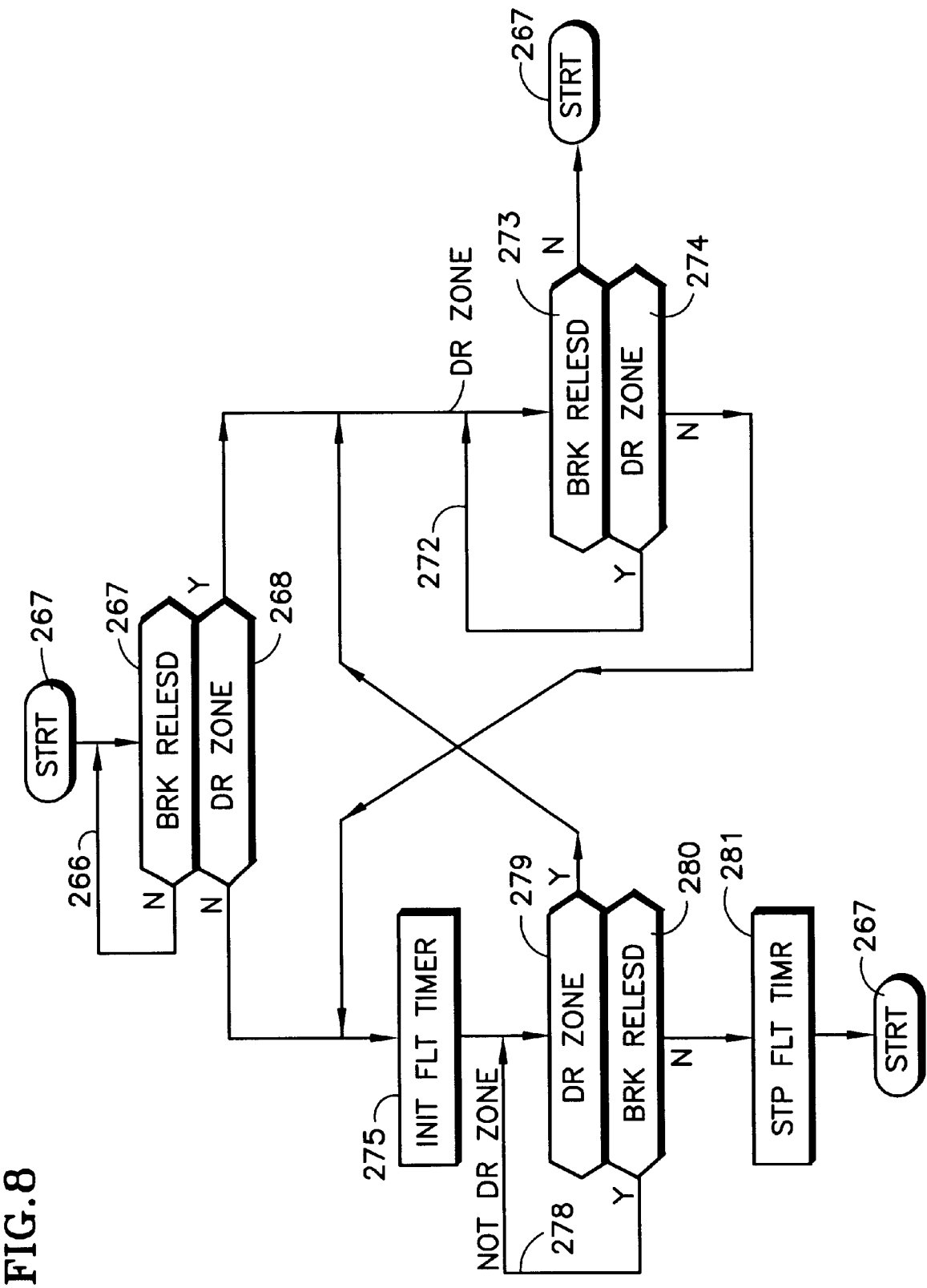
FIG. 8 is a high level logic flow diagram of functions that may be performed to determine the point of time in an elevator run when a door becomes opened.

In FIG. 6, after a door is open in flight and then becomes locked again, step 208 stores the flight timer, which is controlled in FIG. 8. After initialization, a start state 266 is reached through a transfer point 267. Assume that the elevator is stopped at a landing with the doors open. Eventually, the doors close and the brake is released so that a test 267 is affirmative. Initially, the car is still in the door zone so a test 268 is affirmative, entering a door zone state 272. So long as the elevator remains in the door zone, the routine will remain in the door zone state 272, unless the brake is engaged causing a negative result of test 273. During a run, this will not happen unless there is loss of safeties. Once the elevator passes out of the door zone, a test 274 will be negative reaching a step 275 which initiates the flight timer. Then the routine enters a not door zone state 278 in which the routine will normally remain until the car approaches the next landing and therefore enter a door zone. In such a case, a test 279 will be affirmative reaching the door zone state 272 in which it will remain until the brake is engaged at the next landing, when a negative result of test 273 will cause the program to revert to the start state through the transfer point 267. This is the occurrence when there is a normal flight with no notable feature. On the other hand, if, as is described with respect to FIG. 6 hereinbefore, one of the doors opens in flight, this will cause loss of safeties, and the brake will be engaged so that a test 280 will be negative reaching a step 281 to stop the flight timer. This is an indication of when the door opened with respect to the travel of the elevator car beyond the door zone. This is an attribute of doors opening in flight which is a factor that occurs prior to the event of the door opening in flight. Thus, the flight timer indicates when the door opens, but the setting of the flight timer is not stored until either the hoistway doors again become locked (test 201, FIG. 6) or there is a door open command at the next landing (test 202, FIG. 6). Either of these events will reach the step 208 (FIG. 6) to store the setting of the flight timer as an attribute with the feature indicating that one of the doors opened in flight.

Other parameters may be monitored for notable features including abnormal occurrences of various parts of the elevator, along with suitable separation markers, using techniques that are obvious in view of the foregoing.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of monitoring and recording information useful in servicing an elevator having a brake, including maintenance and repair, comprising:

(a) determining, from elevator operational parameters, including events and conditions, the occurrence of events or conditions which constitute notable features having significance with respect to elevator performance, and in response to each occurrence of any of said notable features, providing a corresponding feature signal;

(b) in response to each said feature signal, storing a corresponding manifestation of said notable feature in a chronological log;

(c) determining, from elevator operational parameters, an elevator operational event or condition which signifies the end of an elevator operational sequence within which said notable features may be related to a common causation, and generating a separation marker signal in response thereto; and (d) responsive to said separation marker signal, storing a separation marker manifestation chronologically in said log, said separation marker manifestation separating notable features previously recorded in said log from notable features recorded in said log subsequent to recording said separation marker manifestation therein.

2. A method according to claim 1 wherein said feature signal is generated in response to at least one of a car door reversing direction during closure, loss of non-door elevator safeties, failure of a door lock switch to engage, rebound of a manual hoistway door during closure, a manual hoistway door being open too long, and doors opening in flight.

3. A method according to claim 1 wherein said marker signal is generated in relation to at least one of the beginning of an elevator run, the end of an elevator run, the elevator being parked, or all the door lock switches being engaged.

4. A method according to claim 1, further comprising:

determining a feature space duration related to the time elapsed between the first to occur of one of said notable features that corresponds to one of said separation markers and the last to occur of one of said notable features that corresponds to said one separation marker; and wherein said step (d) comprises storing a manifestation of said duration chronologically with said one separation marker manifestation in said log.

5. A method according to claim 1 wherein said step (d) comprises storing a manifestation of at least one of a date stamp, a time stamp, the number of the floor location of the elevator car, and the direction of travel of the elevator car, chronologically with said separation marker manifestation in said log.

6. A method according to claim 1 further comprising:
   determining at least one duration related to a corresponding one of said notable features for which a corresponding feature signal is provided; and
   said step (b) comprises storing a manifestation of said duration chronologically with said notable feature manifestation in said log.

7. A method according to claim 6 wherein said duration is the duration of said notable feature.

8. A method according to claim 6 wherein said duration is the duration of a condition related to said notable feature.

9. A method according to claim 1, wherein said feature signal is generated in response to one of a car door reversing direction during closure or loss of non-door safeties; and
   said marker signal is generated in response to one of the beginning of an elevator run or the elevator being parked.

10. A method according to claim 9 wherein said marker signal is generated in response to the elevator brake being released.

11. A method according to claim 9 wherein said marker signal is generated in response to said elevator being parked for a predetermined period of time.

12. A method according to claim 11 wherein said period of time is one second if said elevator is parked with its doors closed and is thirty seconds if said elevator is parked with said doors open.

13. A method according to claim 9 wherein:
   said feature signal is generated in response to a car door reversing direction during closure and further comprising:
      determining the duration of said door closing before reversing its direction; and
      said step (b) comprises storing said corresponding feature manifestation as a long reversal, a medium reversal, or a short reversal in dependence upon said duration.

14. A method according to claim 13 wherein said step (b) comprises storing a manifestation of said duration chronologically in said log with said feature manifestation.

15. A method according to claim 9 wherein said feature signal is generated in response to loss of non-door elevator safeties either (1) during an elevator run, in which case said corresponding feature manifestation identifies loss of safeties in flight, or (2) when said elevator is at a landing in which case said corresponding feature manifestation identifies loss of safeties at a landing.

16. A method according to claim 15 further comprising:
   determining the duration of time within which non-door elevator safeties are lost; and
   wherein said step (b) comprises storing a manifestation of said duration chronologically in said log with said feature manifestation.

17. A method according to claim 1 wherein said feature signal is generated in response to one of a failure of at least one door lock switch to engage, a manual hoistway door rebounding upon closure, or a manual hoistway door being open too long; and
   said marker signal is generated in response to all of the car door and hoistway door lock switches being engaged.

18. A method according to claim 17 wherein said marker signal is generated in response to all of said door lock switches being engaged for a predetermined period.

19. A method according to claim 18 wherein said period is one-half second.

20. A method according to claim 17 wherein said feature signal is generated in response to a condition which is one of a failure of at least one door lock switch to engage or a manual hoistway door being open too long, and further comprising:
   determining the duration of said condition; and
   wherein said step (b) comprises storing a manifestation of said duration chronologically in said log with said feature manifestation.

21. A method according to claim 1 wherein said feature signal is generated in response to any elevator door being open in flight; and
   said marker signal is generated in response to the end of the elevator run during which said feature signal was generated.

22. A method according to claim 21 wherein said marker signal is generated in response to a door open command.

23. A method according to claim 21 further comprising:
   determining the duration of an elevator door being open in flight; and
   wherein said step (b) comprises storing a manifestation of said duration chronologically with said feature manifestation.

* * * * *